United States Patent
Lin et al.

(10) Patent No.: US 11,009,980 B2
(45) Date of Patent: May 18, 2021

(54) ARRAY SUBSTRATE AS EXTENDED FINGERPRINT SENSOR, TOUCH-DISPLAY PANEL, AND TOUCH-DISPLAY DEVICE USING SAME

(71) Applicant: HON HAI PRECISION INDUSTRY CO., LTD., New Taipei (TW)

(72) Inventors: Chien-Wen Lin, New Taipei (TW); Yu-Fu Weng, New Taipei (TW); Chia-Lin Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 99 days.

(21) Appl. No.: 16/247,756

(22) Filed: Jan. 15, 2019

(65) Prior Publication Data

US 2019/0377446 A1    Dec. 12, 2019

Related U.S. Application Data

(60) Provisional application No. 62/683,045, filed on Jun. 11, 2018.

(51) Int. Cl.
*G06F 3/041* (2006.01)
*G06F 3/042* (2006.01)
(Continued)

(52) U.S. Cl.
CPC ........ *G06F 3/0412* (2013.01); *G02F 1/13338* (2013.01); *G06F 3/042* (2013.01);
(Continued)

(58) Field of Classification Search
CPC ... G06F 3/0412; G06F 3/042; G06K 9/00013; G06K 9/00067; G06K 9/0004; G02F 1/13338; G02F 1/133514; G09G 3/3648; G09G 2300/0426; G09G 2300/0452; G09G 2354/00; G09G 2360/14
See application file for complete search history.

(56) References Cited

U.S. PATENT DOCUMENTS

| 6,747,290 B2 * | 6/2004 | Yamazaki | ......... | H01L 27/14678 |
| | | | | 257/59 |
| 7,751,600 B2 * | 7/2010 | Yamazaki | .......... | G06Q 20/4014 |
| | | | | 382/124 |

(Continued)

FOREIGN PATENT DOCUMENTS

TW    201723761 A    7/2017

*Primary Examiner* — Michael J Jansen, II
(74) *Attorney, Agent, or Firm* — ScienBiziP, P.C.

(57) ABSTRACT

A fingerprint-sensing array on a substrate includes the substrate, scan lines, data lines, readout lines, sub-pixels, and multiple fingerprint recognition units. Areas between adjacent scan lines and adjacent data lines define one sub-pixel with pixel electrode and a first transistor. Of the first transistor, drain electrode connects to the pixel electrode, source electrode connects to one data line and gate electrode connects to one scan line. Thus some of the sub-pixels contain fingerprint recognition units, these being a photodiode electrically connected to one readout line. The readout line passes signals generated by the photodiode to achieve fingerprint recognition function. A display panel using the array on the substrate and a display device using the display panel are also provided.

2 Claims, 14 Drawing Sheets

(51) Int. Cl.
*G06K 9/00* (2006.01)
*G02F 1/1333* (2006.01)
*G09G 3/36* (2006.01)
*G02F 1/1335* (2006.01)

(52) U.S. Cl.
CPC .... *G06K 9/00013* (2013.01); *G02F 1/133514* (2013.01); *G06K 9/00067* (2013.01); *G09G 3/3648* (2013.01)

(56) References Cited

U.S. PATENT DOCUMENTS

| | | | |
|---|---|---|---|
| 8,891,031 B2 * | 11/2014 | Kim | G06F 3/0412 |
| | | | 349/12 |
| 9,836,165 B2 * | 12/2017 | Nho | G06F 3/042 |
| 2001/0031074 A1 * | 10/2001 | Yamazaki | G06K 9/0002 |
| | | | 382/124 |
| 2002/0079512 A1 * | 6/2002 | Yamazaki | H04N 1/00392 |
| | | | 257/200 |
| 2011/0018893 A1 * | 1/2011 | Kim | G02F 1/133345 |
| | | | 345/589 |
| 2011/0157094 A1 * | 6/2011 | Boer | G06F 3/0421 |
| | | | 345/175 |
| 2011/0181568 A1 * | 7/2011 | Sugiyama | G02F 1/1354 |
| | | | 345/207 |
| 2012/0313913 A1 * | 12/2012 | Shiraki | G06K 9/0004 |
| | | | 345/207 |
| 2015/0331508 A1 * | 11/2015 | Nho | G06F 3/0445 |
| | | | 345/173 |
| 2018/0046025 A1 * | 2/2018 | Liu | G09G 3/34 |
| 2019/0018564 A1 * | 1/2019 | Chen | G06F 3/0412 |
| 2019/0065717 A1 * | 2/2019 | Won | G06K 9/00087 |

* cited by examiner

ARRAY SUBSTRATE AS EXTENDED FINGERPRINT SENSOR, TOUCH-DISPLAY PANEL, AND TOUCH-DISPLAY DEVICE USING SAME

FIELD

The subject matter herein generally relates to touch displays and fingerprint sensors.

BACKGROUND

Fingerprint recognition technology has characteristics of universality, uniqueness, security, collectability, and acceptability. Fingerprint recognition technology is an authentication technology which compares multiple global features and local detail features of fingerprints between different images according to different fingerprints with different characteristics, to determine identity.

Currently, the area for fingerprint recognition on a smart phone is limited, the recognition area is narrow, which may be inconvenient.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
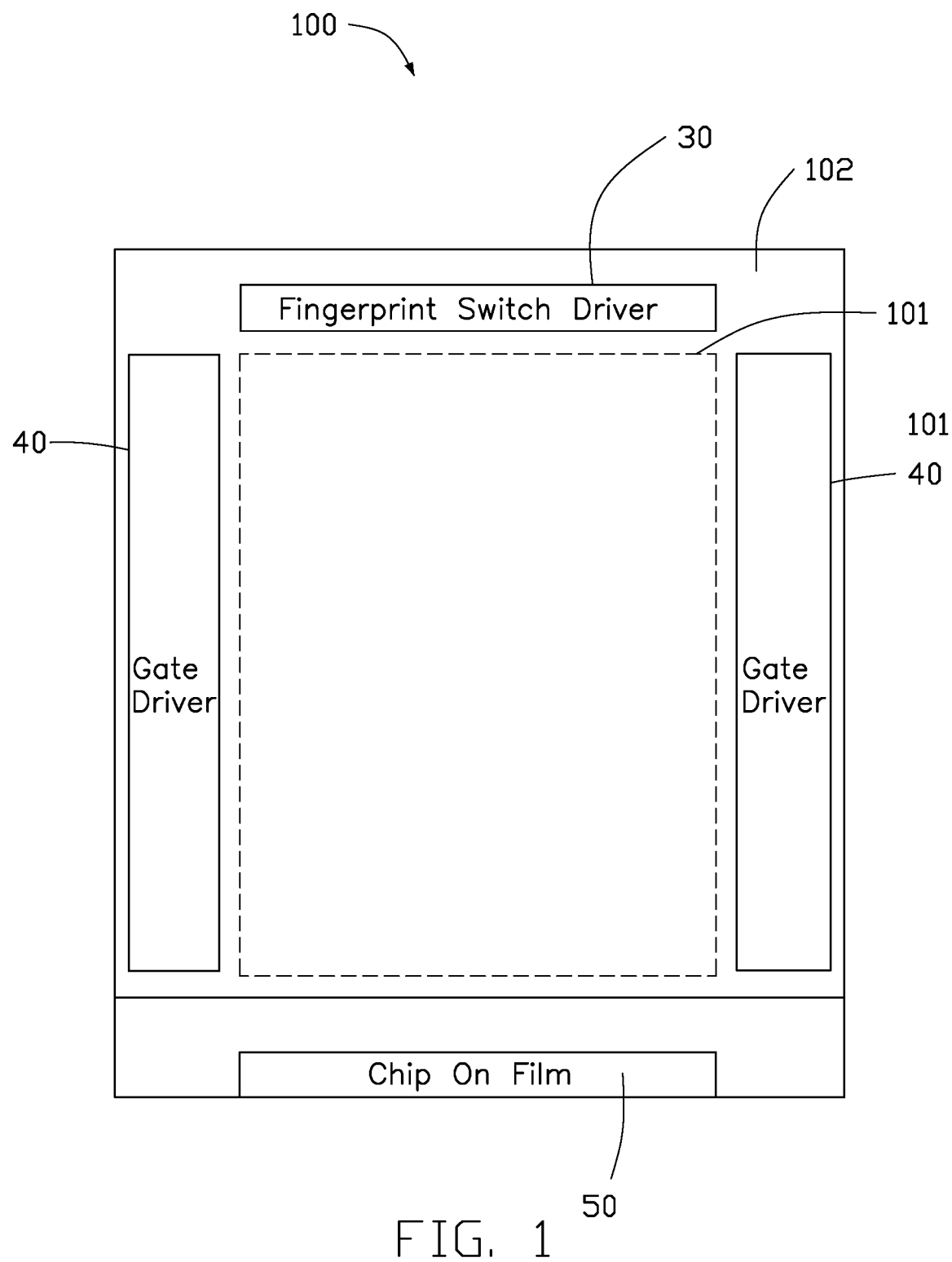
FIG. 1 is a planar view of a display device according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

Figure 3:
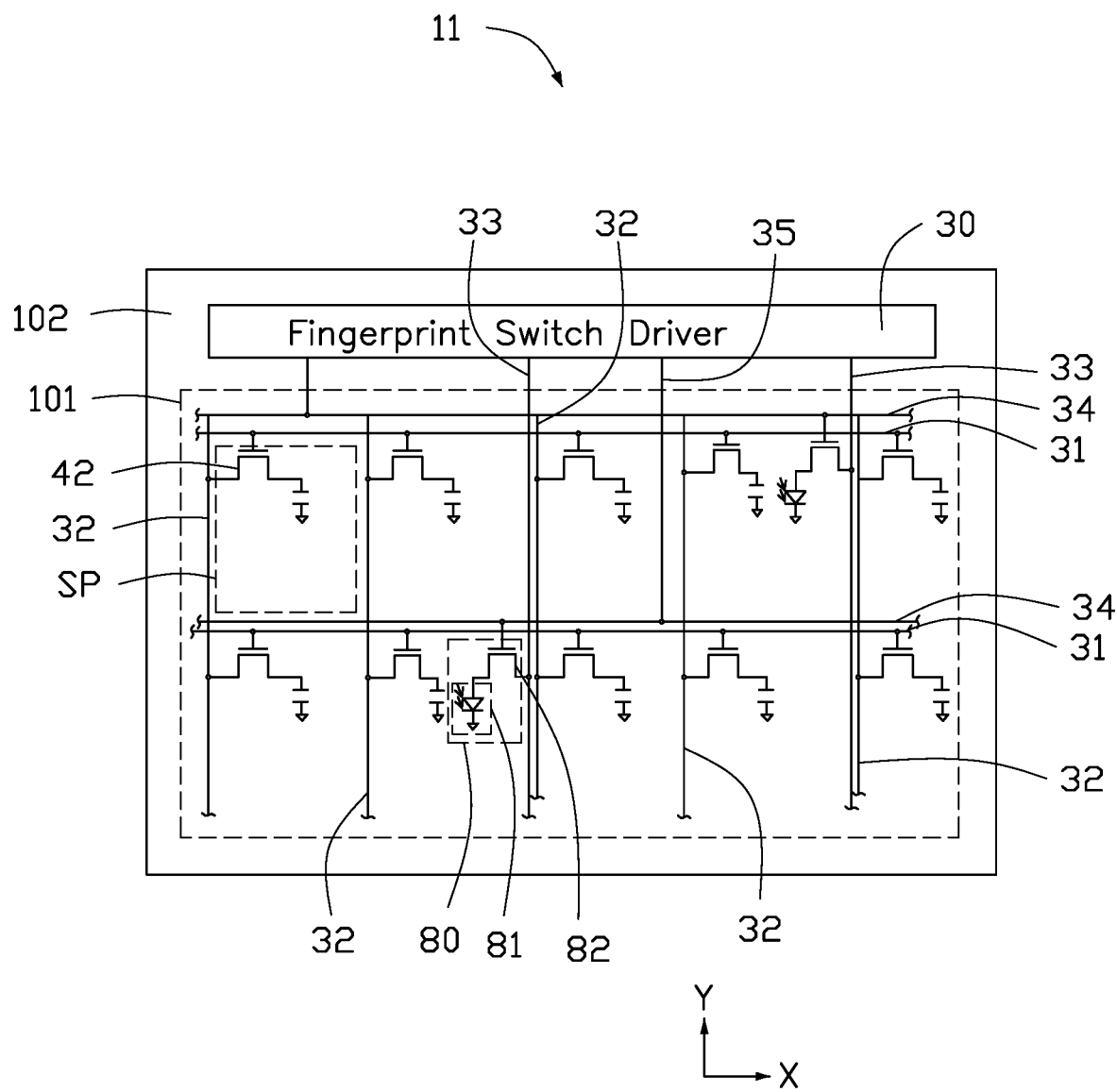
FIG. 3 is a circuit diagram view according to a first embodiment of an array substrate of the display device of FIG. 1.
Figure 6:
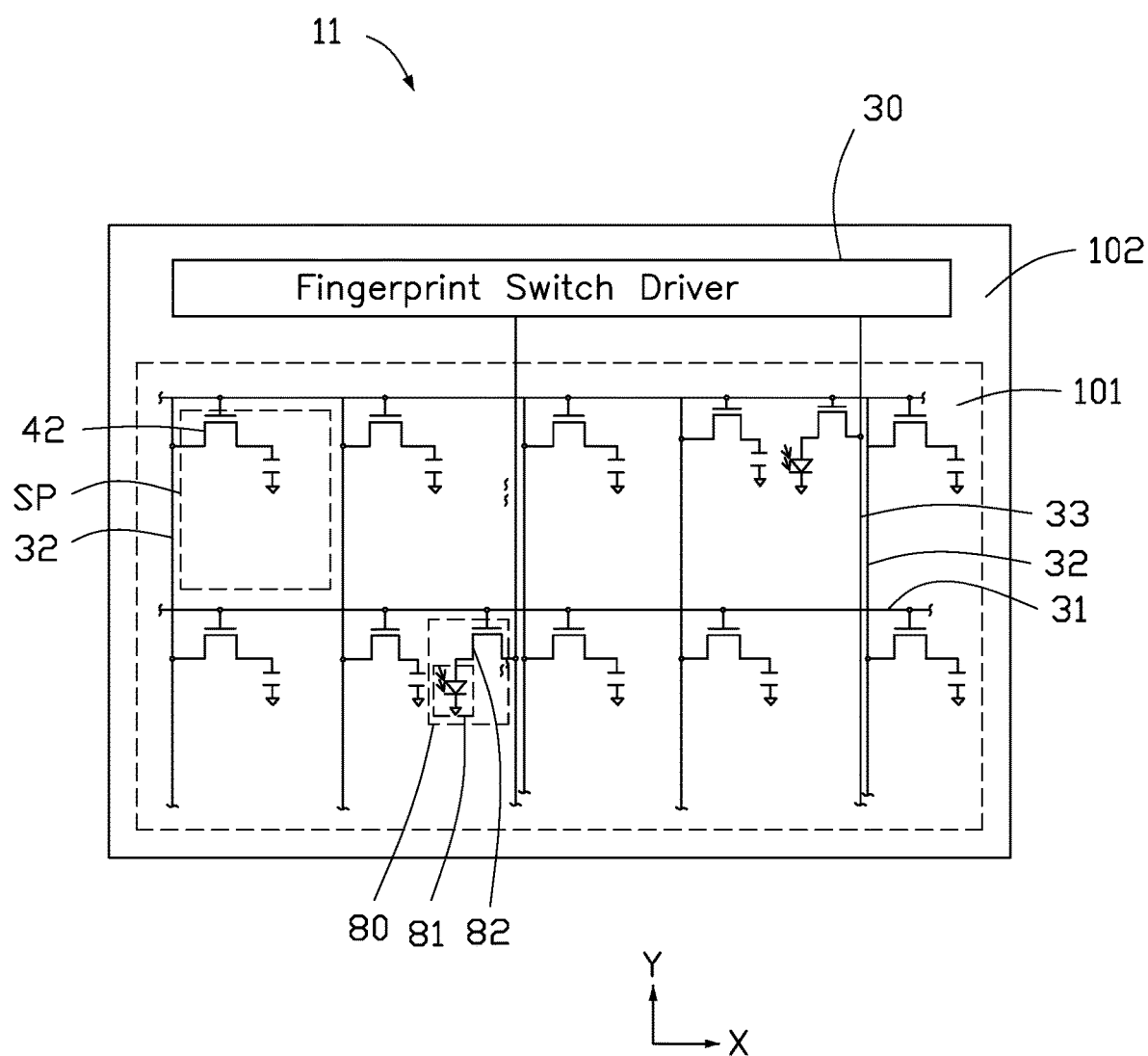
FIG. 6 is a circuit diagram according to a second embodiment of the array substrate in FIG. 3.

FIG. 1 shows a display device 100 according to a first embodiment. The display device 100 defines a display area 101 and a non-display area 102 surrounding the display area 101. The display area 101 includes a plurality of scan lines 31 (as shown in FIGS. 3 and 6), a plurality of data lines 32 (as shown in FIGS. 3 and 6), a plurality of sub-pixels SP (as shown in FIGS. 3 and 6) and a plurality of fingerprint recognition units 80 (as shown in FIGS. 3 and 6). The non-display area 102 includes at least one gate driver 40, a chip on film (COF) 50, and a fingerprint switch driver 30.

In an embodiment, the display device 100 includes two gate drivers 40. The two gate drivers 40 are located at opposite horizontal sides of the non-display area 102. The COF 50 and the fingerprint switch driver 30 are located at the vertical opposite sides of the non-display area 102.

Figure 2:
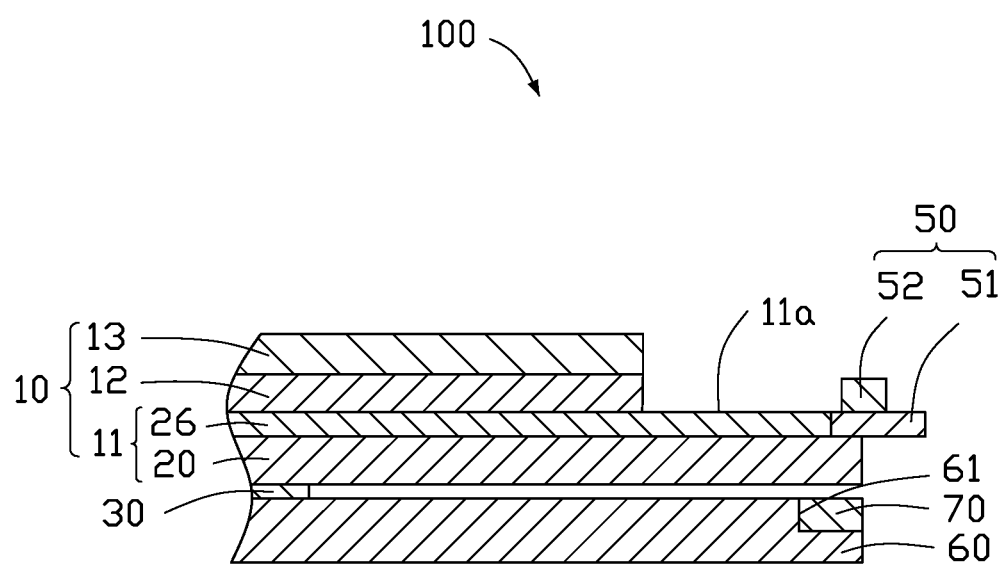
FIG. 2 is a cross sectional view of part of the display device in FIG. 1.

As shown in FIG. 2, the display device 100 includes a display panel 10. The display panel 10 includes an array substrate 11, a color filter substrate 13 opposite to the array substrate 11, and a liquid crystal layer 12 between the color filter substrate 13 and the array substrate 11. The array substrate 11 has an extended region 11a beyond the color filter substrate 13. The array substrate 11 includes a substrate 20 and a thin film transistor array 26 on a side of the substrate 20 facing the color filter substrate 13. A structure of the thin film transistor array 26 (shown simplified in FIG. 2) is schematically shown using only a layered structure. As shown in FIG. 3, the thin film transistor array 26 includes first transistors 42, second transistors 82, and the like. The substrate 20 is transparent, and may be made of glass or transparent plastic.

As shown in FIG. 2, the COF 50 includes a flexible circuit board 51 and a control chip 52 packaged on the flexible circuit board 51. The flexible circuit board 51 is on the substrate 20 and is in the extended region 11a. The flexible circuit board 51 is electrically connected to the thin film transistor array 26 and a main board (not shown) of the display device 100. The control chip 52 is on a surface of the flexible circuit board 51 away from the substrate 20 and is electrically connected to the thin film transistor array 26 through the flexible circuit board 51. In an embodiment, the control chip 52 may be a display driver integrated chip (DDIC) or a touch display driver integration (TDDI).

As shown in FIG. 2, the display device 100 further includes a backlight module 60 and an infrared module 70. The backlight module 60 is on a side of the array substrate 11 away from the color filter substrate 13, and is configured to provide backlighting to the display panel 10. The fingerprint switch driver 30 is between the substrate 20 and the backlight module 60. A surface of the backlight module 60 is recessed to form a receiving space 61, and the infrared module 70 is in the receiving space 61.

As shown in FIG. 3, the scan lines 31 extend along a first direction X, and the data lines 32 extend along a second direction Y intersecting the first direction X. An area surrounded by any adjacent two scan lines 31 and any two adjacent data lines 32 which are insulated from but intersect the two adjacent scan lines 31 defines a sub-pixel SP. Each sub-pixel SP includes a pixel electrode 41 (shown in FIG. 5) and a first transistor 42. A source electrode of the first transistor 42 is electrically connected to one data line 32, and a gate electrode of the first transistor 42 is electrically connected to one scan line 31. Each scan line 31 is configured to turn on or off the first transistor 42 and can thereby input a data voltage from one of the data lines 32 to the pixel electrode 41 through the first transistor 42.

As shown in FIG. 3, the array substrate 11 further includes control lines 34 extending along the first direction X, readout lines 33 extending along the second direction Y, and connecting lines 35 extending along the second direction Y.

Each fingerprint recognition unit 80 is in an area surrounded by every two adjacent control lines 34 and every two adjacent readout lines 33 which are insulated from but intersect the two adjacent control lines 34. Each fingerprint recognition unit 80 includes a photodiode 81 and a second transistor 82. A cathode electrode of the photodiode 81 is grounded, and an anode electrode of the photodiode 81 is electrically connected to a source electrode of the second transistor 82. A gate electrode of the second transistor 82 is electrically connected to one of the control lines 34. The fingerprint switch driver 30 is electrically connected to each control line 34 by one of the connecting lines 35. Thus, the fingerprint switch driver 30 turns on or off the second transistor 82. The fingerprint switch driver 30 is electrically connected to a drain electrode of the second transistor 82 by one readout line 33, and receives and processes the signal generated by the photodiode 81 along the readout line 33.

In an embodiment, at least one of the backlight module 60 and the infrared light module 70 provide backlighting for the fingerprint recognition units 80. When a user's finger presses a top surface of the display device 100, light intensities reflected by ridges and valleys of different fingers are different, so intensities of signals generated by the fingerprint recognition units 80 are different. By detecting the intensity of the photo-sensed signal, the ridges and valleys of the fingers can be identified. Thus, a function of fingerprint recognition is achieved. The photo-sensing signal may be a photocurrent.

FIG. 3 shows a circuit diagram view of a first embodiment of the array substrate shown in FIG. 2. As shown in FIG. 3, the fingerprint recognition units 80 is located in at least some of the sub-pixels SP, and each sub-pixel SP includes one fingerprint recognition unit 80. Thus, the fingerprint recognition function can be achieved in the display area 101. The adjacent sub-pixels SP and at least one fingerprint recognition unit 80 constitute one basic repeating unit, and the basic repeating units are arranged in a matrix.

Figure 4A:
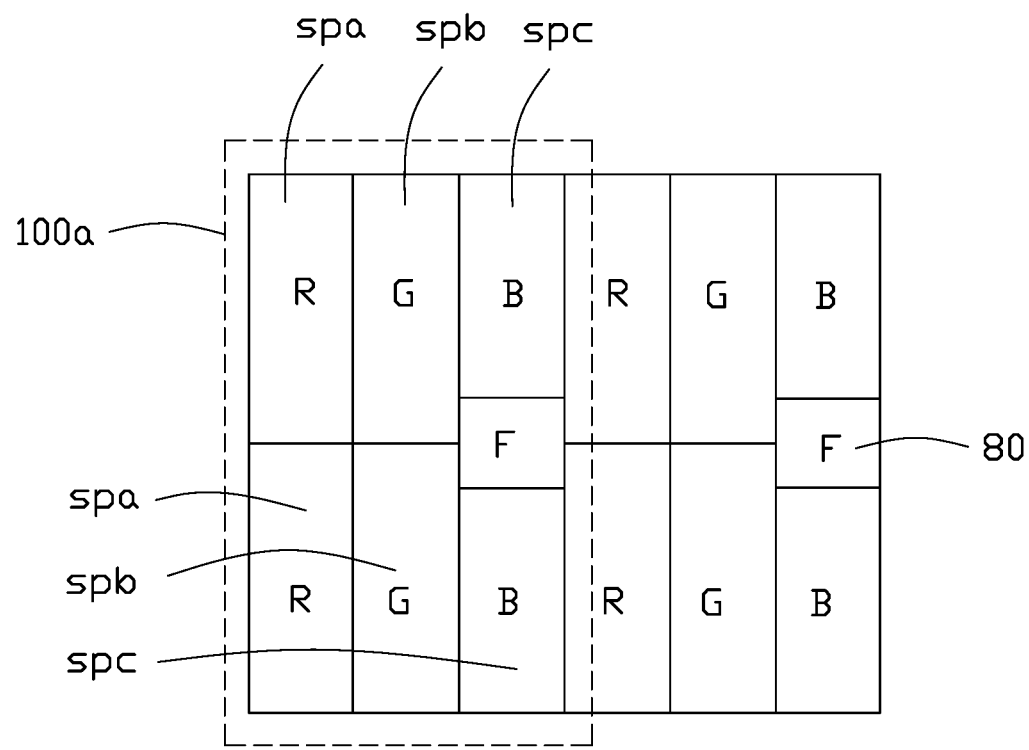
FIG. 4A is a diagram view according to a first embodiment of a basic repeating unit of the array substrate in FIG. 3.

As shown in FIG. 4A, basic repeating units 100a are arranged in a matrix. Each basic repeating unit 100a includes two first sub-pixels Spa, two second sub-pixels Spb, two third sub-pixels Spc, and one fingerprint recognition unit 80.

In odd rows of the basic repeating unit 100a, one second sub-pixel Spb is located between one first sub-pixel Spa and one third sub-pixel Spc. In even rows of the basic repeating unit 100a, one second sub-pixel Spb is located between one first sub-pixel Spa and one third sub-pixel Spc. The fingerprint recognition unit 80 is located between two adjacent third sub-pixels Spc in one column. Part of the fingerprint recognition unit 80 is located at a bottom edge of the third sub-pixel Spc in the odd rows, and the other part of the fingerprint recognition unit 80 is located at an upper edge of the third sub-pixel Spc in the even rows.

In an embodiment, the first sub-pixel Spa emits red light, the second sub-pixel Spb emits green light, and the third sub-pixel Spc emits blue light.

Figure 4B:
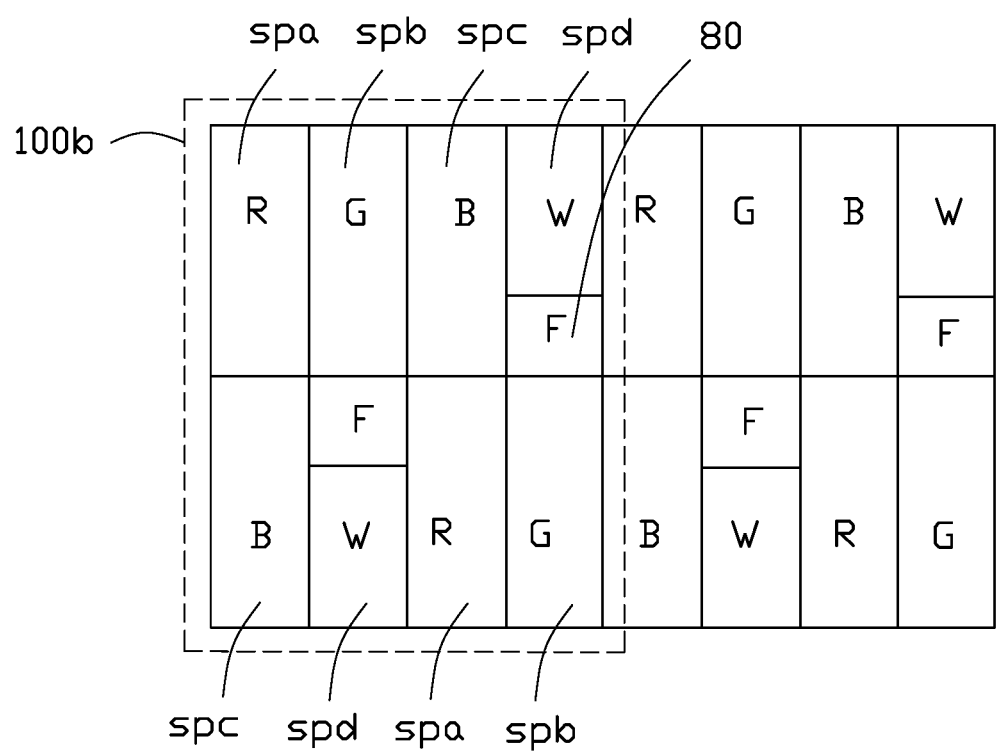
FIG. 4B is a diagram view according to a second embodiment of the basic repeating unit of the array substrate in FIG. 3.

As shown in FIG. 4B, basic repeating units 100b are arranged in a matrix. Each basic repeating unit 100b includes two first sub-pixels Spa, two second sub-pixels Spb, two third sub-pixels Spc, two fourth sub-pixels Spd, and two fingerprint recognition units 80. The two first sub-pixels Spa, the two second sub-pixels Spb, the two third sub-pixels Spc, and the two fourth sub-pixels Spd in each basic repeating unit 100b are arranged in a 2×4 matrix.

In odd rows of the basic repeating unit 100b, one second sub-pixel Spb is located between one first sub-pixel Spa and one third sub-pixel Spc, and one third sub-pixel Spc is located between one second sub-pixel Spb and one fourth sub-pixel Spd. In even rows of the basic repeating unit 100b, one fourth sub-pixel Spd is located between one third sub-pixel Spc and one first sub-pixel Spa, and one first sub-pixel Spa is located between one fourth sub-pixel Spd and one second sub-pixel Spb.

In odd columns of the basic repeating unit 100a, each first sub-pixel Spa alternates with one third sub-pixel Spc. In even columns of the basic repeating unit 100a, one of the two fingerprint recognition units 80 is located on a bottom edge of the fourth sub-pixel Spd adjacent to the second sub-pixel Spb in the following adjacent row. The other one of the two fingerprint recognition units 80 is located on an upper edge of the fourth sub-pixel Spd adjacent to the second sub-pixel Spb in the anterior adjacent row.

In an embodiment, the first sub-pixel Spa emits red light, the second sub-pixel Spb emits green light, the third sub-pixel Spc emits blue light, and the fourth sub-pixel Spd emits white light.

Figure 4C:
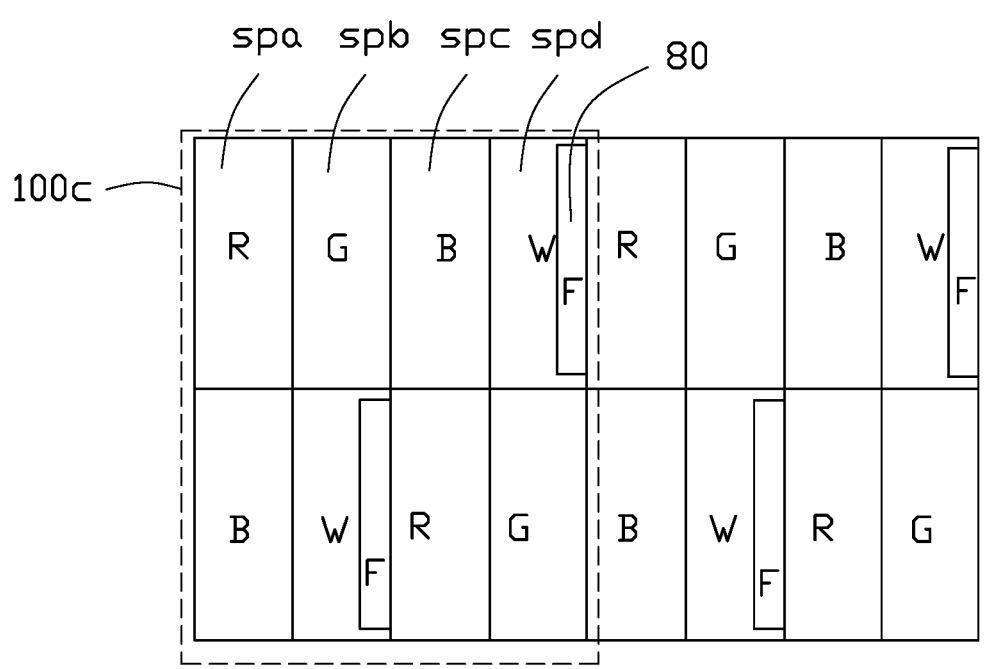
FIG. 4C is a diagram view according to a third embodiment of the basic repeating unit of the array substrate in FIG. 3.

As shown in FIG. 4C, basic repeating units 100c are arranged in a matrix. A difference between the basic repeating unit 100c and the basic repeating unit 100b is positioning of fingerprint recognition units 80. In the basic repeating unit 100c, each fingerprint recognition unit 80 is located on a right edge of the fourth sub-pixel Spd adjacent to the first color sub-pixel Spa in the following adjacent column. In an embodiment, the first sub-pixel Spa emits red light, the second sub-pixel Spb emits green light, the third sub-pixel Spc emits blue light, and the fourth sub-pixel Spd emits white light.

Figure 4D:
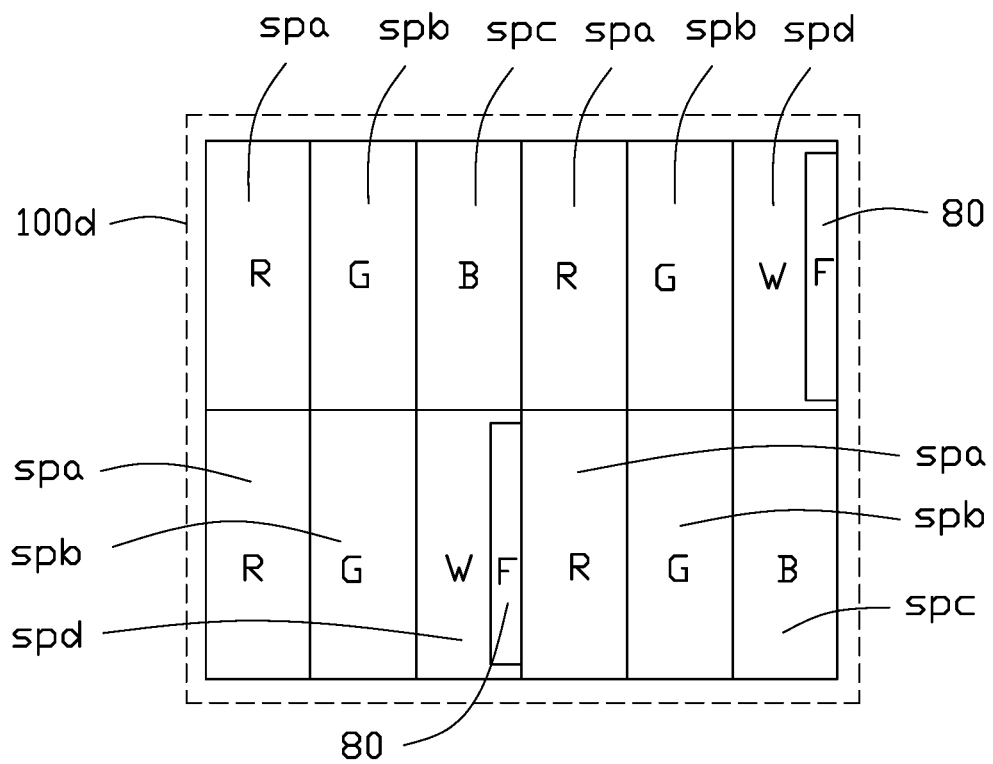
FIG. 4D is a diagram view according to a fourth embodiment of the basic repeating unit of the array substrate in FIG. 3.

As shown in FIG. 4D, basic repeating units 100d are arranged in a matrix. Each basic repeating unit 100d includes four first sub-pixels Spa, four second sub-pixels Spb, two third sub-pixels Spc, two fourth color sub-pixels Spd and two fingerprint recognition units 80. The first sub-pixels Spa, the second sub-pixels Spb, the third sub-pixels Spc, and the fourth sub-pixels Spd in each basic repeating unit 100d are arranged in a 2×6 matrix. Each row of the basic repeating unit 100d includes two first sub-pixels Spa, two second sub-pixels Spb, one third sub-pixel Spc, one fourth sub-pixels Spd, and one fingerprint recognition unit 80.

In odd rows of the basic repeating unit 100d, one second sub-pixel Spb and one third sub-pixel Spc adjacent to the second sub-pixel Spb are located between two first sub-pixels Spa. One third sub-pixel Spc and one first sub-pixel Spa adjacent to the third sub-pixel Spc are located between two second sub-pixels Spb, the fourth sub-pixels Spd are adjacent to one of the two second sub-pixels Spb, and the fingerprint recognition unit 80 is located on a right edge of the fourth color sub-pixel Spd adjacent to the first color sub-pixel Spa in the adjacent basic repeating unit 100d.

In even rows of the basic repeating unit 100d, one second sub-pixel Spb and one fourth sub-pixel Spd adjacent to the second sub-pixel Spb are located between two first sub-pixels Spa. One fourth sub-pixel Spd and one first sub-pixel Spa adjacent to the fourth sub-pixel Spd are located between two second sub-pixels Spb, the third sub-pixels Spc are adjacent to one of the two second sub-pixels Spb, and the fingerprint recognition unit 80 is located on a right edge of the fourth color sub-pixel Spd adjacent to the first color sub-pixel Spa.

In an embodiment, the first sub-pixel Spa emits red light, the second sub-pixel Spb emits green light, the third sub-pixel Spc emits blue light, and the fourth sub-pixel Spd emits white light.

Figure 4E:
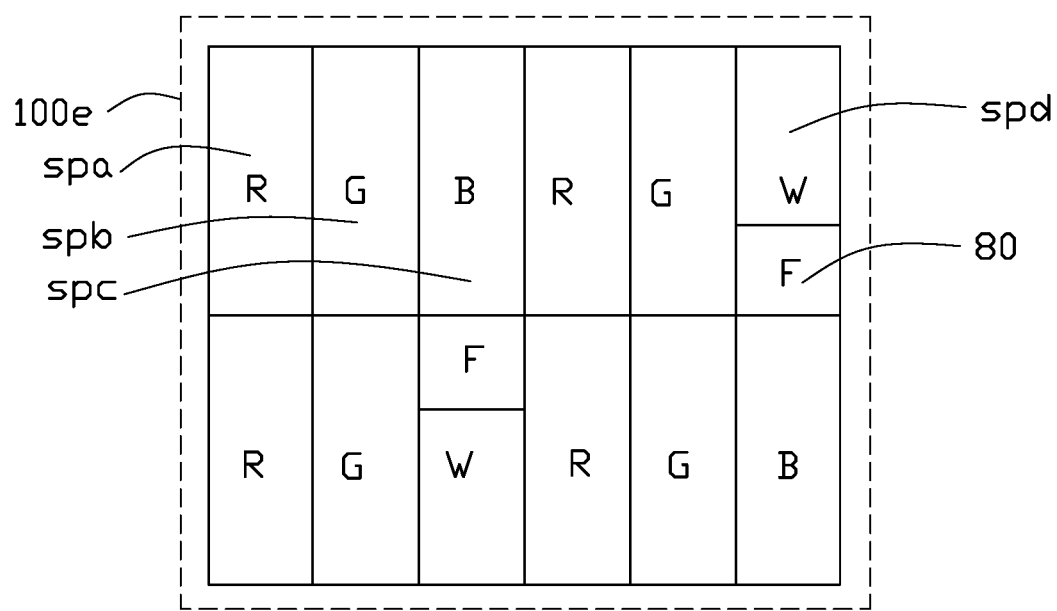
FIG. 4E is a diagram view according to a fifth embodiment of the basic repeating unit of the array substrate in FIG. 3.

As shown in FIG. 4E, basic repeating units 100e are arranged in a matrix. A difference between the basic repeating unit 100e and the basic repeating unit 100d is the positioning of fingerprint recognition units 80. In the basic repeating unit 100e, each fingerprint recognition unit 80 is located in the fourth sub-pixel Spd adjacent to the second sub-pixel Spb in the adjacent row.

Figure 5:
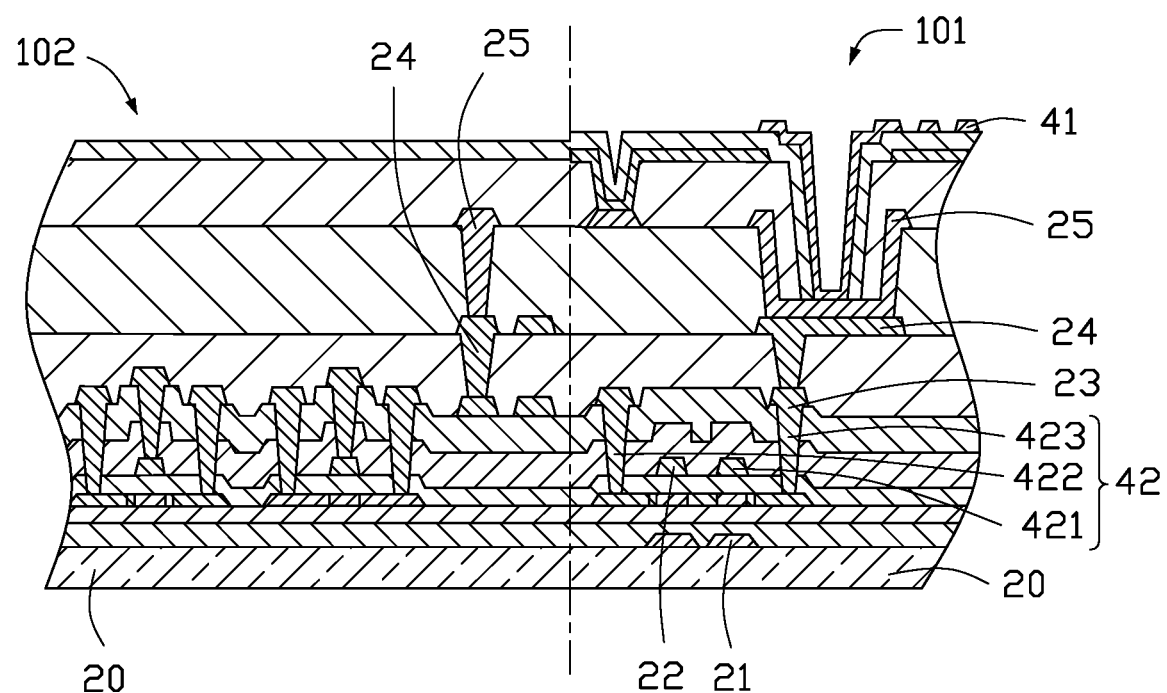
FIG. 5 is a cross sectional view of part of the array substrate in FIG. 3.

As shown in FIG. 5, a first conductive layer 21 is located on the substrate 20 and a second conductive layer 22 is located on a side of the first conductive layer 21 away from the substrate 20. A third conductive layer 23 is located on a side of the second conductive layer 22 away from the substrate 20, a fourth conductive layer 24 is located on a side of the third conductive layer 23 away from the substrate 20, and a fifth conductive layer 25 is located on a side of the fourth conductive layer 24 away from the substrate 20.

In the display area 101, the first conductive layer 21 is patterned to form the readout lines 33. The second conductive layer 22 is patterned to form the gate electrode 421 of each first transistor 42 and the scan lines 31 and the third conductive layer 23 is patterned to form a source electrode 422 and a drain electrode 423 of each first transistor 42 and the data lines 32. The drain electrode 423 of each first transistor 42 is electrically connected to one pixel electrode 41 by the fourth conductive layer 24 and the fifth conductive layer 25. In this embodiment, the first transistor 42 is a top gate type-double gate transistor.

In the non-display area 102, the fourth conductive layer 24 is patterned to form the connecting lines 35 and the fifth conductive layer 25 is patterned to form the control lines 34. Each control line 34 is electrically connected to the fingerprint switch driver 30 by one connecting line 35. In another embodiment, the fourth conductive layer 24 is patterned to form the control lines 34 and the fifth conductive layer 25 is patterned to form the connecting lines 35. That is, the control lines 34 and the connecting lines 35 are located in different conductive layers.

FIG. 6 shows a circuit diagram of a second embodiment of the array substrate shown in FIG. 2. As shown in FIGS. 6A and 3, a difference between the second embodiment of the array substrate and the first embodiment of the array substrate is connection arrangement of the second transistor 82. In the second embodiment, the gate electrode of the second transistor 82 is connected to one of the scan lines 31, the source electrode of the second transistor 82 is connected to the anode electrode of the photodiode 81, and the drain electrode of the second transistor 82 is connected to fingerprint switch driver 30 by one readout line 33. The control lines 34 and the connecting lines 35 are thus omitted.

Each scan line 31 turns on and turns off the first transistors 42 and the second transistors 82 in a time division manner. During a display period as one time division, each scan line 31 controls the first transistors 42 and during a fingerprint sensing period as a second time division, each scan line 31 turns on and turns off the second transistor 82.

Figure 7:
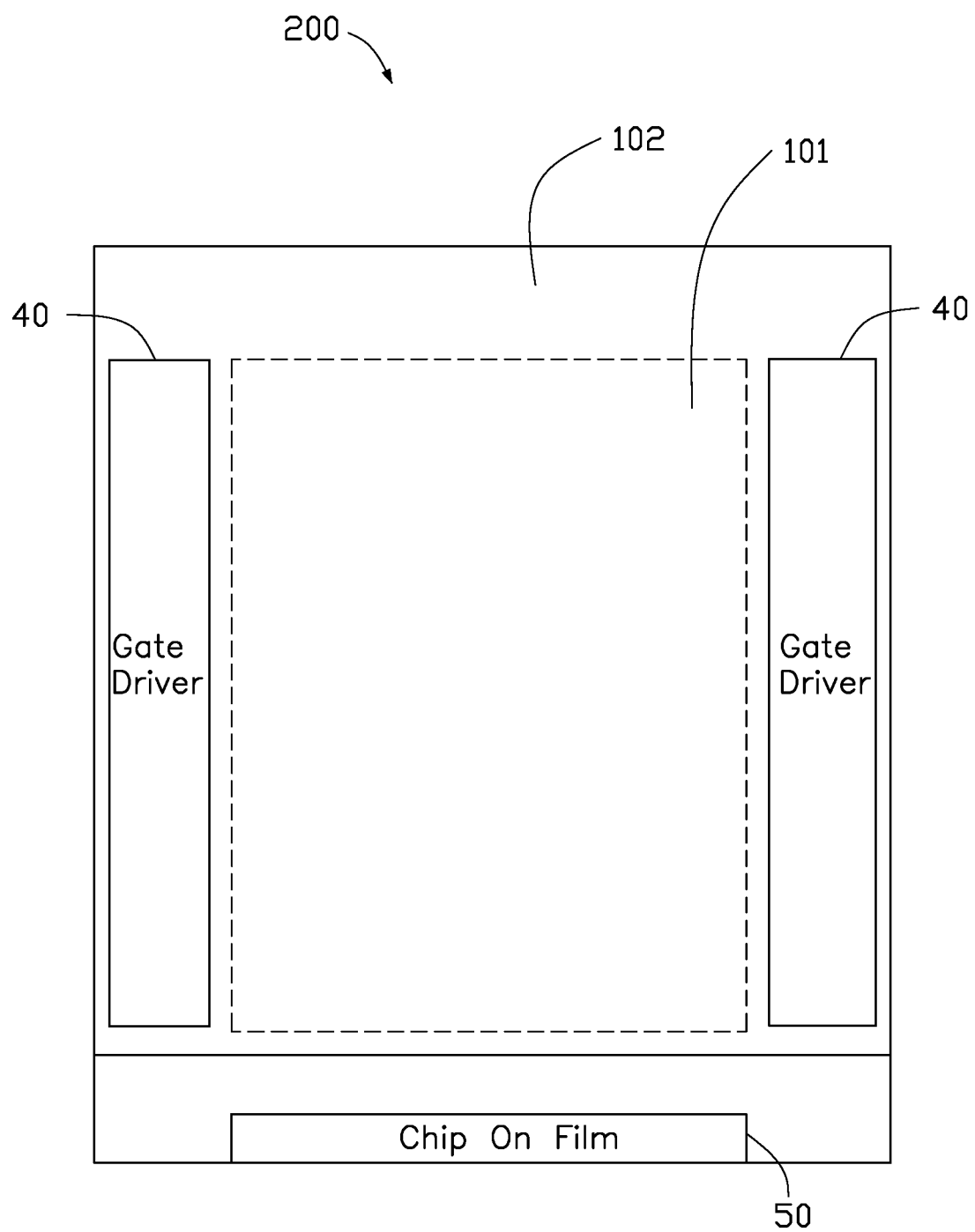
FIG. 7 is a planar view of a display device according to a second embodiment.
Figure 8:
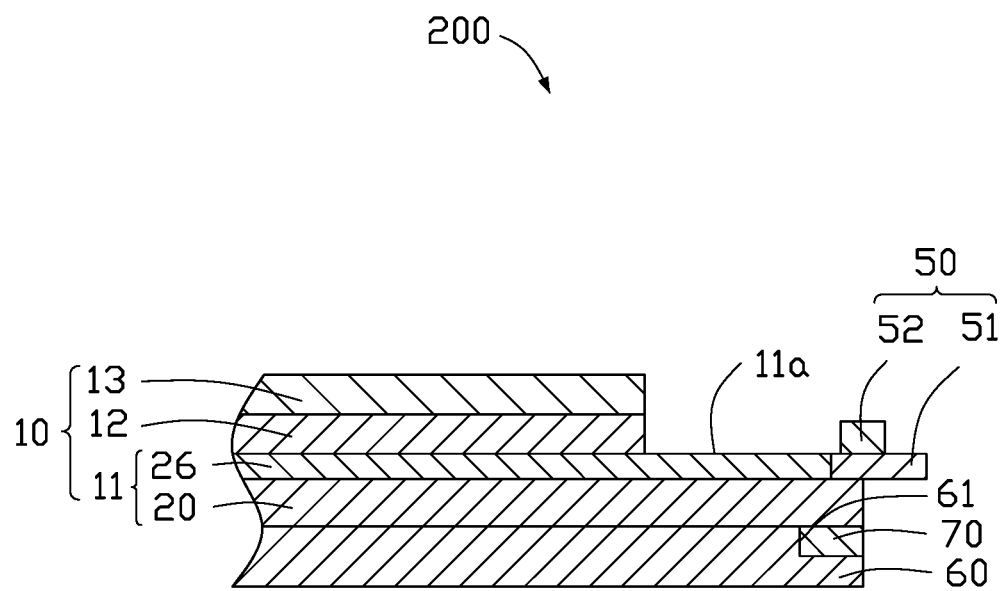
FIG. 8 is a cross sectional view of part of the display device in FIG. 7.

FIGS. 7 and 8 show a display device 200 of a second embodiment. A difference between the display device 200 and the display device 100 is the fingerprint switch driver 30. In the display device 200, the fingerprint switch driver 30 is integrated in the control chip 52. The flexible circuit board 51 is located on a surface of the substrate 20 away from the backlight module 60 and is located in the extended region 11a. The flexible circuit board 51 is electrically connected to the thin film transistor array 26 and the main board (not shown) of the display device 200. The control chip 52 is located on a surface of the flexible circuit board 51 away from the substrate 20 and is electrically connected to the thin film transistor array 26 by the flexible circuit board 51.

In the display device 200, the control chip 52 may include a display driving integrated chip and the fingerprint switch driver 30 or may include a touch display driver integration and the fingerprint switch driver 30.

Figure 9:
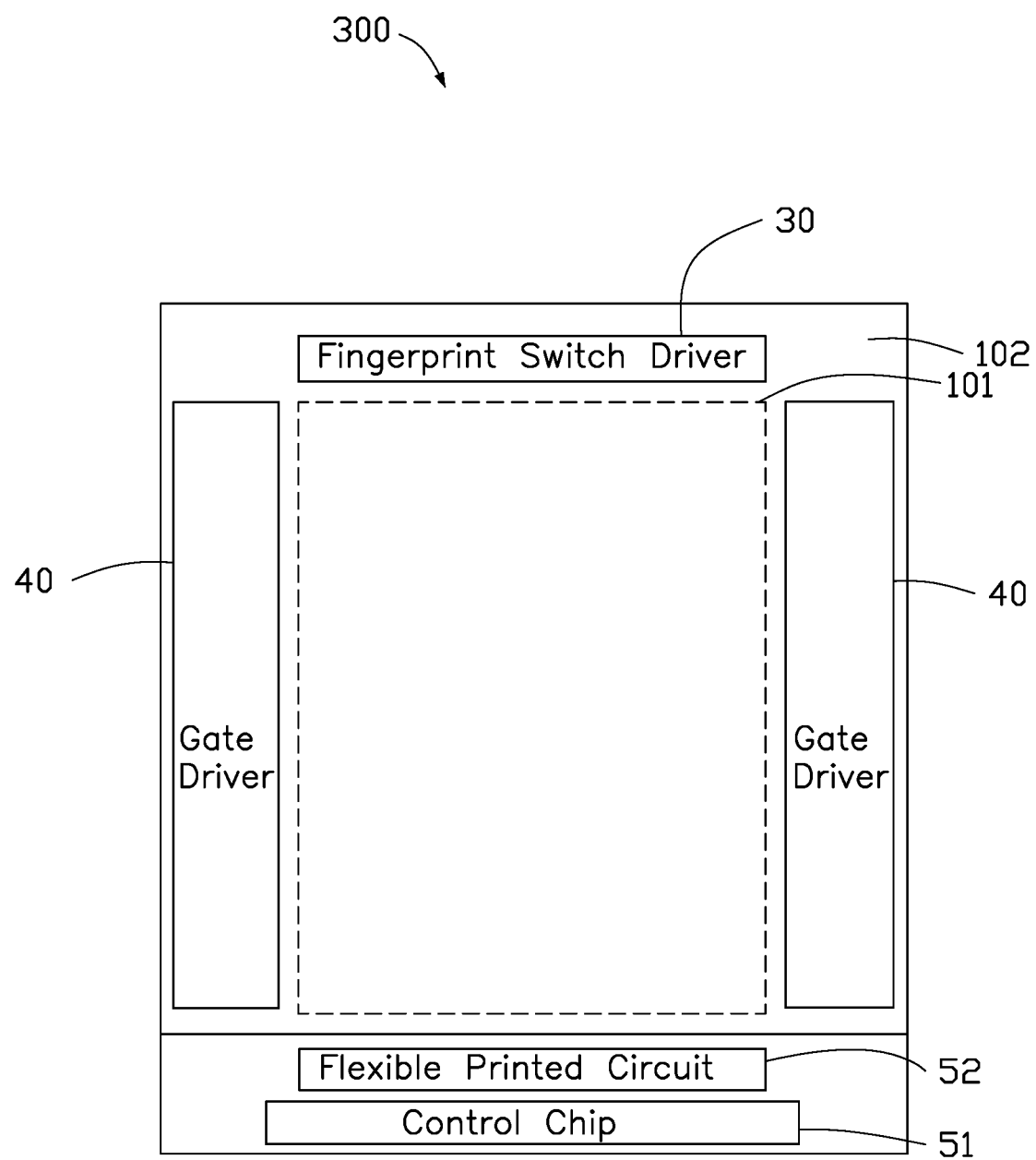
FIG. 9 is a planar view of a display device according to a third embodiment.
Figure 10:
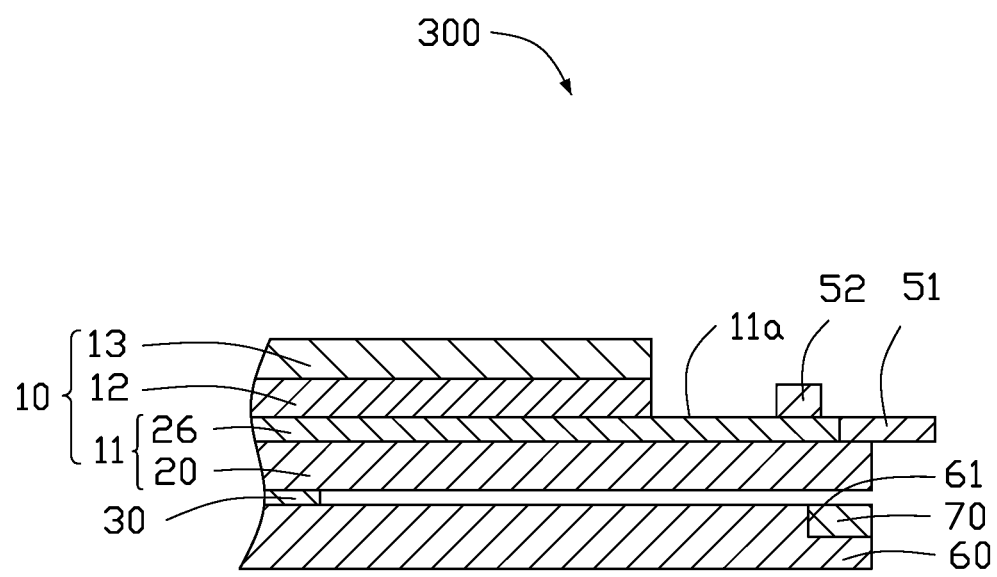
FIG. 10 is a cross-sectional view of part of the display device in FIG. 9.

FIG. 9 and FIG. 10 show a display device 300 of a third embodiment. A difference between the display device 300 and the display device 100 is the positioning of the control chip 52. In the display device 300, the control chip 52 is located on a surface of the thin film transistor array 26 away from the substrate 20 and is located in the extended region 11a, the control chip 52 is electrically connected to the thin film transistor array 26. The flexible circuit board 51 is electrically connected to the thin film transistor array 26 and a main board (not shown) of the display device 300.

Figure 11:
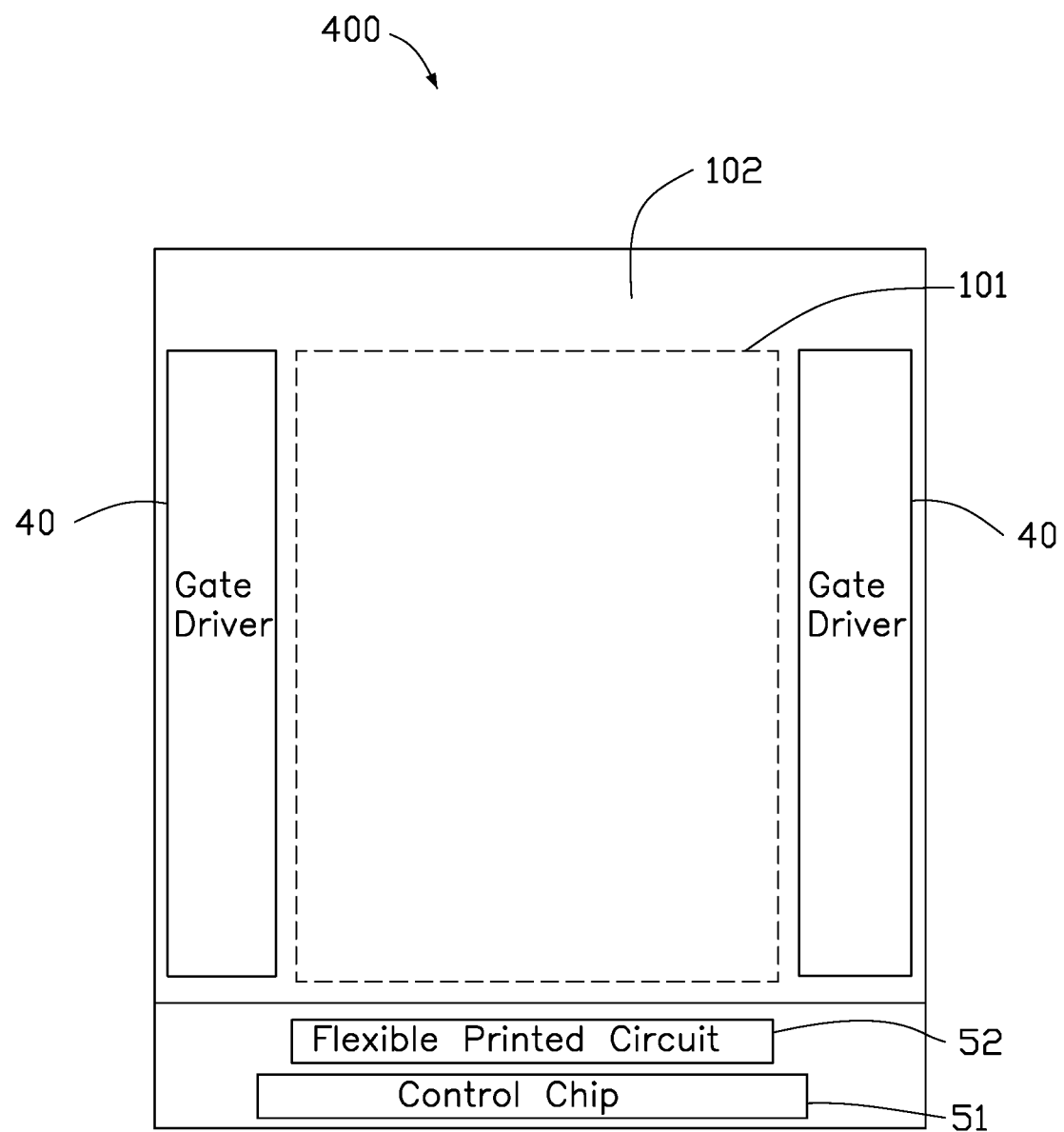
FIG. 11 is a planar view of a display device according to a fourth embodiment.
Figure 12:
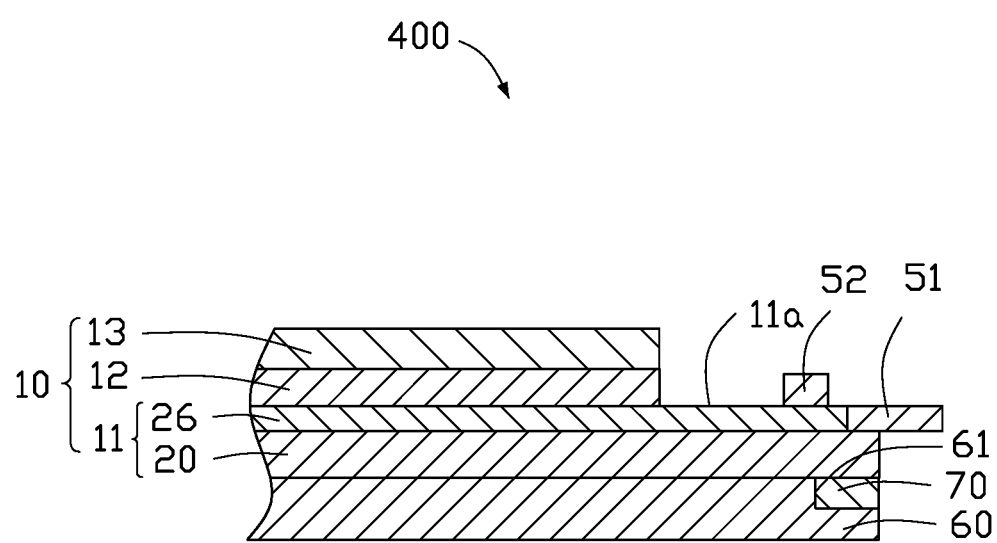
FIG. 12 is a cross sectional view of part of the display device in FIG. 11.

FIGS. 11 and 12 show a display device 400 of a fourth embodiment. A difference between the display device 400 and the display device 300 is the fingerprint switch driver 30. In the display device 400, the fingerprint switch driver 30 is integrated in the control chip 52. The control chip 52 is located on a surface of the thin film transistor array 26 away from the substrate 20 and is located in the extended region 11a. The control chip 52 is electrically connected to the thin film transistor array 26. The flexible circuit board 51 is electrically connected to the thin film transistor array 26 and a main board (not shown) of the display device 400.

In the display device 400, the control chip 52 may include a display driving integrated chip and the fingerprint switch driver 30 or may include a touch display driver integration and the fingerprint switch driver 30.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. An array substrate comprising:
a substrate;
a plurality of scan lines on the substrate and extending in a first direction;
a plurality of data lines on the substrate and on a side of the plurality of scan lines away from the substrate, and extending in a second direction intersecting the first direction;
a plurality of sub-pixels, an area surrounded by any two adjacent scan lines and any two adjacent data lines insulatively intersecting the two adjacent scan lines defines one sub-pixel, each of the plurality of sub-pixels comprising a pixel electrode and a first transistor, a drain electrode of the first transistor electrically connected to the pixel electrode, a source electrode of the first transistor electrically connected to one of the plurality of data lines, and a gate electrode of the first transistor electrically connected to one of the plurality of scan lines; a plurality of readout lines on the substrate and between the substrate and the plurality of scan lines;
a plurality of fingerprint recognition units, located in at least some of the plurality of sub-pixels, and each of the at least some of the plurality of sub-pixels comprising one of the plurality of fingerprint recognition units, wherein each of the plurality of fingerprint recognition units comprises a photodiode, the photodiode is electrically connected to one of the plurality of readout lines, and each of the plurality of readout lines is configured to read a photo-sensing signal generated by the photodiode to achieve fingerprint recognition; and
a fingerprint switch driver, wherein the fingerprint switch driver is electrically connected to the plurality of readout lines to receive and process the photo-sensing signal generated by the photodiode;
wherein the array substrate further comprises a plurality of control lines extending along the first direction;
the fingerprint recognition unit further comprises a second transistor, a source electrode of the second transistor is electrically connected to the photodiode, a drain electrode of the second transistor is electrically connected to one of the plurality of readout lines, and a gate electrode of the second transistor is electrically connected to one of the plurality of control lines; and
the plurality of control lines is configured to turn on and turn off the second transistor;
wherein the array substrate further comprises a plurality of connecting lines extending along the second direction;
each of the plurality of control lines is electrically connected to the fingerprint switch driver by one of the plurality of connecting lines; and
the plurality of control lines, the plurality of readout lines, and the plurality of connecting lines are formed from different conductive layers.

2. A display panel comprising an array substrate, a color filter substrate opposite to the array substrate, and a liquid crystal layer between the color filter substrate and the array substrate, the array substrate comprising:
a substrate;
a plurality of scan lines on the substrate and extending in a first direction;
a plurality of data lines on the substrate and on a side of the plurality of scan lines away from the substrate, and extending in a second direction intersecting the first direction;
a plurality of sub-pixels, an area surrounded by any two adjacent scan lines and any two adjacent data lines insulatively intersecting the two adjacent scan lines defines one sub-pixel, each of the plurality of sub-pixels comprising a pixel electrode and a first transistor, a drain electrode of the first transistor electrically connected to the pixel electrode, a source electrode of the first transistor electrically connected to one of the plurality of data lines, and a gate electrode of the first transistor electrically connected to one of the plurality of scan lines;
a plurality of readout lines on the substrate and between the substrate and the plurality of scan lines;
a plurality of fingerprint recognition units, located in at least some of the plurality of sub-pixels, and each of the at least some of the plurality of sub-pixels comprising one of the plurality of fingerprint recognition units, wherein each of the plurality of fingerprint recognition units comprises a photodiode, the photodiode is electrically connected to one of the plurality of readout lines, and each of the plurality of readout lines is configured to read a photo-sensing signal generated by the photodiode to achieve fingerprint recognition; and
a fingerprint switch driver, wherein the fingerprint switch driver is electrically connected to the plurality of readout lines to receive and process the photo-sensing signal generated by the photodiode;
wherein the array substrate further comprises a plurality of control lines extending along the first direction;
the fingerprint recognition unit further comprises a second transistor, a source electrode of the second transistor is electrically connected to the photodiode, a drain electrode of the second transistor is electrically connected to one of the plurality of readout lines, and a gate electrode of the second transistor is electrically connected to one of the plurality of control lines; and
the plurality of control lines is configured to turn on and turn off the second transistor;
wherein the array substrate further comprises a plurality of connecting lines extending along the second direction;
each of the plurality of control lines is electrically connected to the fingerprint switch driver by one of the plurality of connecting lines; and
the plurality of control lines, the plurality of readout lines, and the plurality of connecting lines are formed from different conductive layers.

* * * * *